United States Patent
Stefan

(10) Patent No.: US 11,242,070 B2
(45) Date of Patent: Feb. 8, 2022

(54) APPARATUS AND METHOD FOR DETERMINING AN ATTENTION REQUIREMENT LEVEL OF A DRIVER OF A VEHICLE

(71) Applicant: Ford Global Technologies, LLC, Dearborn, MI (US)

(72) Inventor: Frederic Stefan, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 16/677,840

(22) Filed: Nov. 8, 2019

(65) Prior Publication Data
US 2020/0148225 A1 May 14, 2020

(30) Foreign Application Priority Data
Nov. 8, 2018 (DE) .......................... 102018219103.4

(51) Int. Cl.
*B60W 50/14* (2020.01)
*B60W 40/09* (2012.01)
(Continued)

(52) U.S. Cl.
CPC ............ *B60W 50/14* (2013.01); *B60W 40/09* (2013.01); *B60W 40/10* (2013.01);
(Continued)

(58) Field of Classification Search
CPC ...... B60W 50/14; B60W 40/09; B60W 40/10; B60W 2554/00; B60W 2555/20; B60W 2540/18; B60W 2520/10; B60W 2520/105; B60W 2554/406; B60W 60/0053; B60W 40/08; B60W 60/0013; B60W 40/04; B60W 40/105; B60W 40/107; B60W 50/00; B60W 2050/0043; G06K 9/00845; G06K 9/00791; H04W 4/40; H04W 4/38
See application file for complete search history.

(56) References Cited

U.S. PATENT DOCUMENTS

2008/0185207 A1* 8/2008 Kondoh ................ B60W 30/16
180/272
2013/0038437 A1* 2/2013 Talati ..................... B60K 37/06
340/438
(Continued)

FOREIGN PATENT DOCUMENTS

CN 202743235 U * 2/2013

*Primary Examiner* — Brian Wilson
(74) *Attorney, Agent, or Firm* — Brandon Hicks; Eversheds Sutherland (US) LLP

(57) ABSTRACT

An apparatus (100) for determining an attention requirement level of a driver of a vehicle is provided, which comprises a first signal processing unit (101), a second signal processing unit (104), a third signal processing unit (107), a fourth signal processing unit (110), and an attention requirement determination unit (113), connected to the first, second, third and fourth signal processing unit (101, 104, 107, 110) and configured to determine an attention requirement level (114) as a function of current values of the first, second, third and fourth attention requirement parameters (103, 106, 109, 112). In addition, a vehicle (200) having such an apparatus (100) and an operating method (300) for the apparatus (100) are provided.

18 Claims, 3 Drawing Sheets

Figure 1:
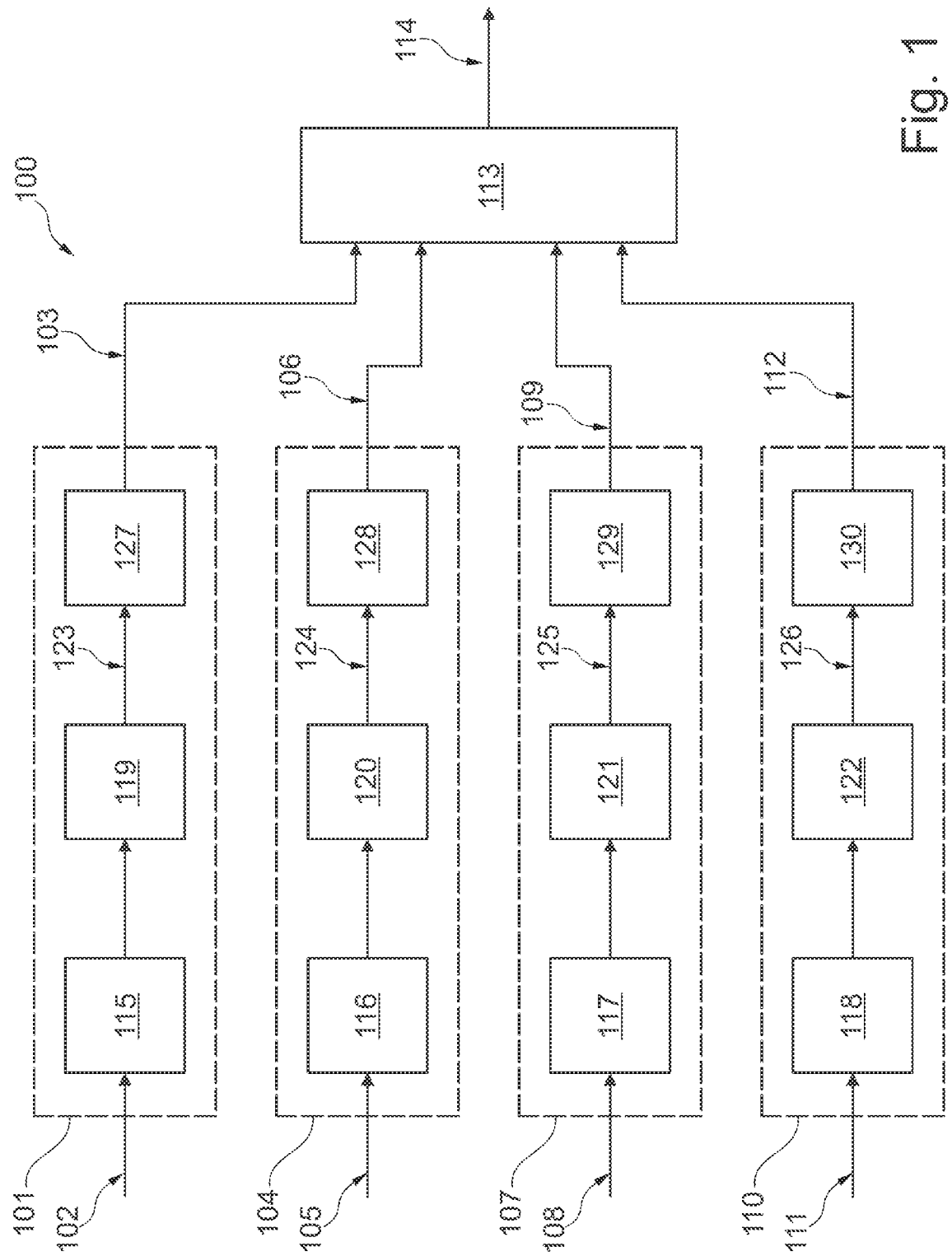

(51) Int. Cl.
    *G06K 9/00*           (2006.01)
    *H04W 4/40*         (2018.01)
    *B60W 40/10*       (2012.01)

(52) U.S. Cl.
    CPC ..... *G06K 9/00791* (2013.01); *G06K 9/00845* (2013.01); *H04W 4/40* (2018.02); *B60W 2540/18* (2013.01); *B60W 2554/00* (2020.02); *B60W 2555/20* (2020.02)

(56) References Cited

U.S. PATENT DOCUMENTS

2013/0294642 A1* 11/2013 Wang ................ G06K 9/00261
                                                              382/103
2019/0367050 A1* 12/2019 Victor ................ G06K 9/00845

* cited by examiner

APPARATUS AND METHOD FOR DETERMINING AN ATTENTION REQUIREMENT LEVEL OF A DRIVER OF A VEHICLE

CROSS-REFERENCE TO RELATED APPLICATIONS

This application claims priority to and the benefit of German patent application No. 102018219103.4, filed Nov. 8, 2018, which is hereby incorporated by reference herein in its entirety.

The present invention relates to an apparatus for determining a required level of attentiveness, i.e. an attention requirement level, of a driver of a vehicle, to a vehicle which has such an apparatus and to a method with which an attention requirement level of a driver of a vehicle can be determined by using such an apparatus.

The required degree of attentiveness of the driver of a vehicle, in particular of a motor vehicle, strongly depends on the current, possibly dynamically changing, circumstances under which the vehicle is operated in traffic. Thus in a society in which the total level of traffic is constantly increasing, the attentiveness of the driver, i.e. their concentration on the traffic conditions and the behavior of the vehicle, in particular a manually controlled vehicle, is necessary at all times, wherein in specific traffic situations such as particularly heavy traffic, which can lead to congestion, the attention should be increased further, since a particularly large range of dynamic influencing factors can affect the journey.

With the increasing popularity of driver assistance systems and partially autonomously driven, i.e. partly self-controlling vehicles, there are also traffic situations in which the driver can, in principle, be temporarily occupied with other things, without directing his/her complete attention to the events occurring on the road. As a result, however, phases also occur in which the driver's attention must be directed (back) to the traffic conditions and the control of the vehicle. These include, for example, the transfer phases in which control is passed from the vehicle back to the driver. This also relates to the phases in which the situations in which the vehicle is operating, i.e. the current driving circumstances, are so complex, unstable or uncertain that they could easily change and a transfer phase might be required, or the vehicle may even relinquish control itself in the interests of safety.

In U.S. Pat. No. 9,740,203 B2 a driving assistance device is disclosed, in which a temporarily autonomously driven vehicle determines a remaining distance or time interval, by the end of which a transfer of control from the vehicle back to the driver must be completed, wherein it is provided to use a concentration level estimating unit to estimate the degree of concentration of the driver based on condition parameters, determined using sensors, that describe the driver's condition, and depending on the driver's condition and the remaining transfer distance or time, to determine how much the driver should be stimulated to regain control of the vehicle.

In patent DE 10 2012 112 802 A1 a method is described in which during an autonomous or semi-autonomous driving mode of a vehicle, environmental data and driving-dynamics data of a vehicle and possibly data of a navigation system can be identified, which are merged in an evaluation unit. The situation described by the merged data is evaluated with regard to detection of a hazardous situation, and from this using a risk estimation unit a transfer probability is determined that an operator intervention will take place. Using an attention estimation unit, the attention level of the driver is estimated and depending on this level of attention a duration until a warning signal is generated for the driver is determined from the transfer probability.

In U.S. Pat. No. 9,840,257 B2 a device for displaying information in a vehicle is disclosed. In this, with a driver attention estimation unit the attentiveness of the driver is estimated, and taking into account vehicle and environmental information, as a function of the estimate an information display is configured with which the driver is informed of a process of transfer of control from an autonomous driving mode to a manually controlled driving mode.

In US 2017/0248952 A1 an autonomous control of a vehicle, in particular based on the attentiveness of the occupants of the vehicle, is described. In this case, sensor signals are evaluated which capture aspects of the condition of the driver and the vehicle and the area around the vehicle. A driver alertness factor, a driver readiness factor, a driver action probability and a self-driving confidence factor or risk factor are determined, the combination of which is used to determine the degree of self-control of the vehicle that is set.

However, systems that place the driver at the center of their estimate of the driving situation function with varying degrees of success, depending on how well the individual status of each individual driver is captured by the sensors and analysis methods used, whether the environmental sensors used capture the sensor data particularly relevant to this driver, and depending on how well the correlation of measured sensor data from the environmental sensors and driver condition sensors reflects the actual context for each individual driver.

It is the object of the present invention to provide a system for vehicles, which enables an evaluation of the traffic situation of a vehicle to be provided independently of the individual condition of the driver in a simple manner, which can then be used as an estimate of an objectively required attentiveness of drivers.

This object is achieved according to the invention with an apparatus for determining an attention requirement level of a driver of a vehicle according to claim 1, a vehicle according to claim 15 which has such an apparatus, and with a suitable operating method according to claim 17. Advantageous designs of the invention are described in the dependent claims.

According to a first aspect of the invention, an apparatus for determining a required attention level of a driver of a vehicle comprises a first signal processing unit, configured to receive and process traffic situation-related first input signals and to provide a traffic situation-related first attention requirement parameter, a second signal processing unit, configured to receive and process environmental condition-related second input signals and to provide an environmental condition-related second attention requirement parameter, a third signal processing unit, configured to receive and process vehicle status-related third input signals, and to provide a vehicle status-related third attention requirement parameter, a fourth signal processing unit, configured to receive and process travel route-related fourth input signals and to provide a travel route-related fourth attention requirement parameter, and an attention requirement determination unit, connected to the first, second, third and fourth signal processing unit and configured to determine an attention requirement level as a function of current values of the first, second, third and fourth attention requirement parameters.

The apparatus is provided for describing the overall dynamic situation in which the vehicle is situated as comprehensively as possible by sensor data first of all being recorded in four different categories or "dimensions". These capture different aspects that influence the overall traffic situation. They are processed and the data obtained are compressed to form a set of attention requirement parameters, each of which quantifies the situation with regard to the category. Only then will the attention requirement determination unit merge the four parameters into a single assessment of the overall traffic situation, the attention requirement level. This provides a maximally objective level of attention which would at least be necessary in a given traffic situation, regardless of the current actual condition of the driver and the degree of stimulation which would be individually needed to create this level of attention in the driver under certain circumstances. The demands that traffic situations place on a driver thus become more comparable.

In addition, by reducing the different categories to single parameter values the attention requirement level can be determined in a simple manner, for example by evaluating a simple formula with four input variables. Depending on the embodiment, this also allows general relationships to be easily taken into account, for example as interdependent weighting factors: For example, if the environmental condition-related second input signal is an indicator for daylight, then relationships such as "if it is dark, then evaluate the traffic situation parameter higher than in bright daylight" can easily be considered.

No merging of the sensor values from the different categories into a "traffic scene" takes place, which is captured in as much detail as possible and analyzed as a whole and must then be evaluated. On the one hand, this avoids taking supposed relationships between the individual data items as given, which improves the potential objectivity of a determined level of required attention. On the other hand, measurement and evaluation procedures and devices that are already available can therefore be used to some extent. Complex procedures and devices are only used where necessary. In addition, such an approach avoids creating complex interrelationships due to the evaluation of combined measurements, which would also require a complex evaluation. Here, on the other hand, parameters that characterize a category and can be determined with simple means can also be determined in a simple way, and complex methods are only used where they are needed. In this way, the overall apparatus is less complex, simpler and less expensive to implement.

To achieve this, the four signal processing units collect and process signals that are different to each other, so that at least four different sources are always evaluated and an associated parameter is determined in each category. A reduction to only one category, for example vehicle data or traffic situation data, is avoided. Since the processing is carried out separately for each of the four signal processing units and only then is the required attention level, i.e. the attention requirement level, determined from this, possibly after an adjustment or "normalization" to a common value range, separate signal processing units can already be present, for example, in some cases already provided in the context of other driver assistance systems whose signals are now also processed in the apparatus according to the invention. The separation allows processing chains of differing complexity to be realized. In addition, the measured input signals may be updated at different frequencies, and there is more freedom to distribute the sensors at different independent locations in the vehicle.

In one embodiment the first, second, third and fourth signal processing units each comprise at least one sensor unit for receiving the associated first, second, third or fourth input signals, connected in each case to a corresponding first, second, third and fourth evaluation unit to provide respective associated first, second, third or fourth evaluation signals. Each of the four categories comprises a sensor unit having at least one sensor, with which an associated input signal or with which a plurality of associated input signals of the category are captured. Depending on the sensor used, the respective evaluation unit can be simple, for example if the sensor already provides a quantitatively analyzable signal, or complex if, for example, the sensor signal contains a large amount of information, or different input signals from different sensors of the same category are combined. It may be provided, for example, to determine the number of vehicles in the image of a camera sensor together with their distances and speeds, and to merge these in a single evaluation signal which reflects the density of the recorded traffic.

In one exemplary embodiment, the first, second, third and fourth signal processing units, each have a metric transformation unit, configured to provide the associated first, second, third or fourth attention requirement parameters. These are the transformation results of the metric transformations of the first, second, third and fourth evaluation signals. In this way, the evaluations are represented in numerical values, which can be computed with the parameter values of the other categories or else can be compared. Depending on the signals to be transformed and/or the extracted features, the metric transformations can also use, in addition to transfer functions, for example, classification functions which have been determined, for example, during real or virtual training procedures.

In a preferred exemplary embodiment, the first, second, third and fourth metric transformation units are each configured to perform transformations of the first, second, third or fourth evaluation signals into a common value range. For example, metric transformation units can be implemented with processors or logic circuits. In particular, in one embodiment a fuzzy logic circuit is implemented and/or a fuzzy function is implemented. The metric transformation produces a comparability of the parameter values, either directly or after scaling of the parameter values.

In a particularly preferred exemplary embodiment, the first, second, third and fourth metric transformation units are each configured to use a sigmoid transfer function to transform the first, second, third or fourth evaluation signals into the common value range. In this way, for example, a realistic transition from 0 to 1 can be modeled as a substantially S-shaped curve, which often applies to real relationships. In general, a sigmoid function is a limited and differentiable real function with a consistently positive or consistently negative first derivative and exactly one turning point.

A simple sigmoid function for the i=1, 2, 3, 4 attention requirement parameters $P_i$ is given by:

$$P_i = \frac{1}{1 + e^{-\alpha F_i}}$$

In the equation $F_i$ is the current or extracted value of the evaluation signal to be transformed and $\alpha$ is a parameter which can be used to manipulate the shape of the sigmoid function. Each value $F_i$ is thus transformed into a $P_i$ value with a value range from 0 to 1, wherein typically a value 0 corresponds to the case of the minimum required attention by the driver, while a value of 1 corresponds to the case of the maximum required attention by the driver.

In one embodiment, the at least one sensor unit for receiving the associated first input signals is designed to collect traffic situation-related information in an environment around the vehicle. This can involve the positions and speeds and dimensions of other vehicles, the detection of traffic signs, e.g. warning signs or speed limit signs, the detection of the positions of buildings, trees, pedestrians, etc., the width of the road or the characteristics of the road surface, as well as traffic information received via radio or the internet.

In one exemplary embodiment, the at least one sensor unit for receiving the corresponding first input signals comprises at least one of the following: a camera sensor, laser sensor, LIDAR sensor, radar sensor, ultrasonic sensor, a wireless interface for receiving information about other road users via a V2X communication link. Traffic situation-related first input signals can therefore often easily be captured with sensors, for example, which are already provided in the vehicle for other driver assistance systems, e.g. for the detection of objects in the vehicle's environment or possibly to support autonomous driving, so that retrofitting with such sensors might not be required. V2X refers here to an electronic communication of road users with each other. It includes, in particular, the communication vehicle-to-vehicle (V2V), vehicle-to-road (V2R), vehicle-to-infrastructure (V2I), vehicle-to-network (V2N) and vehicle-to-persons (V2P).

In one embodiment, the at least one sensor unit for receiving the associated second input signals is designed to collect environmental conditions in an area around the vehicle. The environmental conditions under which the vehicle is currently being operated represent an essential parameter to describe the complexity of the situation in which the vehicle is operating. For example, knowledge of the environmental conditions allows the parameters of the other categories to be better classified, for example by weighting or scaling of those parameter values.

In one exemplary embodiment the environmental conditions comprise at least one of the following: visibility conditions, brightness, time of day, in particular daytime, night-time, dusk, weather conditions, in particular precipitation conditions and temperature conditions, geographical conditions. For example, depending on the environmental condition to be captured, a brightness meter, a clock, a moisture sensor and a thermometer can be used as second sensor units for this purpose. If the geographical conditions are captured (for example, urban, rural, mountainous, highway, local road, etc.), this takes place, for example, using the evaluation of information from a GPS receiver (GPS—Global Positioning System), a camera, from TMS-information or information received via V2I. The category "environmental conditions" directly relates to the operating safety of the vehicle and thus the required attentiveness of the driver. For example, poor visibility conditions due to time of day or precipitation or changes in the grip of the vehicle tires on the road due to moisture, rain or at excessively low temperatures also due to ice or snow, will generally increase the required attention level, in particular in very heavy traffic, for example. In addition, for example in city traffic more unexpected events must be allowed for than in the case of long-distance driving.

In a further embodiment, the at least one sensor unit for receiving the associated third input signals is designed to collect information on the status of the vehicle. Vehicle status information, such as the current speed of the vehicle, can often have a significant effect on the required attention of the driver and can often be retrieved via the vehicle bus, e.g. CAN bus (Controller Area Network, CAN), in a simple manner from corresponding sensors, memories or control units in the vehicle.

In one exemplary embodiment the vehicle status conditions comprise at least one of the following: the vehicle speed, vehicle acceleration, steering angle, activation states of driver assistance systems. For example, the non-activation status of driver assistance systems present requires a higher concentration from the driver, as do acceleration situations, for example during overtaking maneuvers, or particularly fast driving on the highway, especially in heavy traffic.

In a further embodiment, the at least one sensor unit for receiving the associated fourth input signals is designed to collect travel route-related information of the vehicle. Travel route-related information represents a separate category, in which the current traffic situation is not evaluated, but from information about the previous and/or also the planned travel route conclusions are drawn about the current situation of the driver and the vehicle.

In one exemplary embodiment the travel route-related information comprises at least one of the following: distance traveled, travel time to date, speed profile. The previously traveled distance and/or the duration of the journey so far, i.e. the journey of the vehicle, are thus an indicator of whether the concentration capacity of the driver may already have decreased. If the speed profile indicates that the speed was essentially the same for a long time with little variance, this indicates a monotonous journey: In the case of a vehicle controlled by the driver him/herself, this may have led to a loss of concentration, while in the case of an autonomously driven vehicle, by contrast, a low level of attention is in this case acceptable. A large variance of the speed profile indicates a driving route which until now has required a high level of attention, for example, due to the traffic or the terrain profile, and suggests that an increased attention will also continue to be required.

In one embodiment, the attention requirement determination unit is configured to determine the attention requirement level by averaging the current values of the first, second, third and fourth attention requirement parameters. In the averaging operation the arithmetic mean of the four parameter values is determined, for example. This enables a very simple and fast determination of the attention requirement level, wherein the parameter values of all four categories are taken into account. If the parameter values have been transformed onto the same value range by the metric transformation units, all parameter values are input into the calculation with the same weight. In addition, for example, a weighting of the values can be provided, e.g. based on statistical data collections. In addition, further conditions can be taken into account in calculating the attention requirement level. For example, if in a value range of the parameter values from 0 to 1 (where the value 1 corresponds to the maximum required attention, the value 0 to no or minimal required attention) one of the parameter values already has the value 1, the maximum attention requirement level should already be a maximum, regardless of the calculated average value of all parameter values.

In one embodiment, the attention requirement determination unit can also be designed such that it can be configured retrospectively so that, for example, by the driver or via remote control, i.e. a wirelessly received control signal, the function with which the attention requirement level is determined can be changed or switched between different configurations in order to obtain, for example, a more or less conservatively determined attention requirement level.

Determining the attention requirement level as the arithmetic mean of the attention requirement parameter values is one of the less conservative configurations.

According to a second aspect of the invention a vehicle comprises an apparatus for determining an attention requirement level in accordance with one of the embodiments described above. In this way, the advantages and special features of the apparatus according to the invention for determining an attention requirement level of a driver of a vehicle are also implemented within a suitable vehicle.

In a preferred embodiment the vehicle also comprises an attention increasing device connected to the apparatus for determining an attention requirement level and configured to stimulate the attention of a driver of the vehicle as a function of the determined attention requirement level, and to direct it towards controlling the vehicle. Depending on the embodiment of the attention increasing device it can be provided, for example, to trigger different levels of stimulation when differently defined threshold values are exceeded by the attention requirement level, such as visual stimuli and light signals with different colors, increasing flashing frequency or size, tactile stimuli, for example vibration of the steering wheel, or acoustic stimuli in the form of audio signals at different volume levels and possibly with different text, depending on whether the intention is only to prepare for the imminent transfer from the autonomous mode into the manual mode, or whether to issue an urgent warning of an acute danger. Depending on the intended stimulation of the driver the attention increasing device can have one or more human-machine interfaces, for example (combinations of) displays, light indicators, speakers, wearables, data goggles, head-up displays or vibration devices.

According to a third aspect of the invention, a method for determining a required attention level of a driver of a vehicle using an apparatus according to any one of the above embodiments comprises receiving and processing of traffic situation-related first input signals and providing a traffic situation-related first attention requirement parameter, receiving and processing of environmental condition-related second input signals and providing an environmental condition-related second attention requirement parameter, receiving and processing of vehicle status-related third input signals and providing a vehicle status-related third attention requirement parameter, receiving and processing of travel route-related fourth input signals and providing a travel route-related fourth attention requirement parameter, and determining an attention requirement level as a function of current values of the first, second, third and fourth attention requirement parameters. In this way, the advantages and special features of the apparatus according to the invention for determining an attention requirement level of a driver of a vehicle can also be implemented in the context of a suitable operating method.

In one embodiment the method also comprises stimulating, using an attention increasing device, the attention of the driver of the vehicle depending on the attention requirement level determined. In this way, the attention requirement level can be used to control whether and how much the driver's behavior should be influenced.

Figure 2:
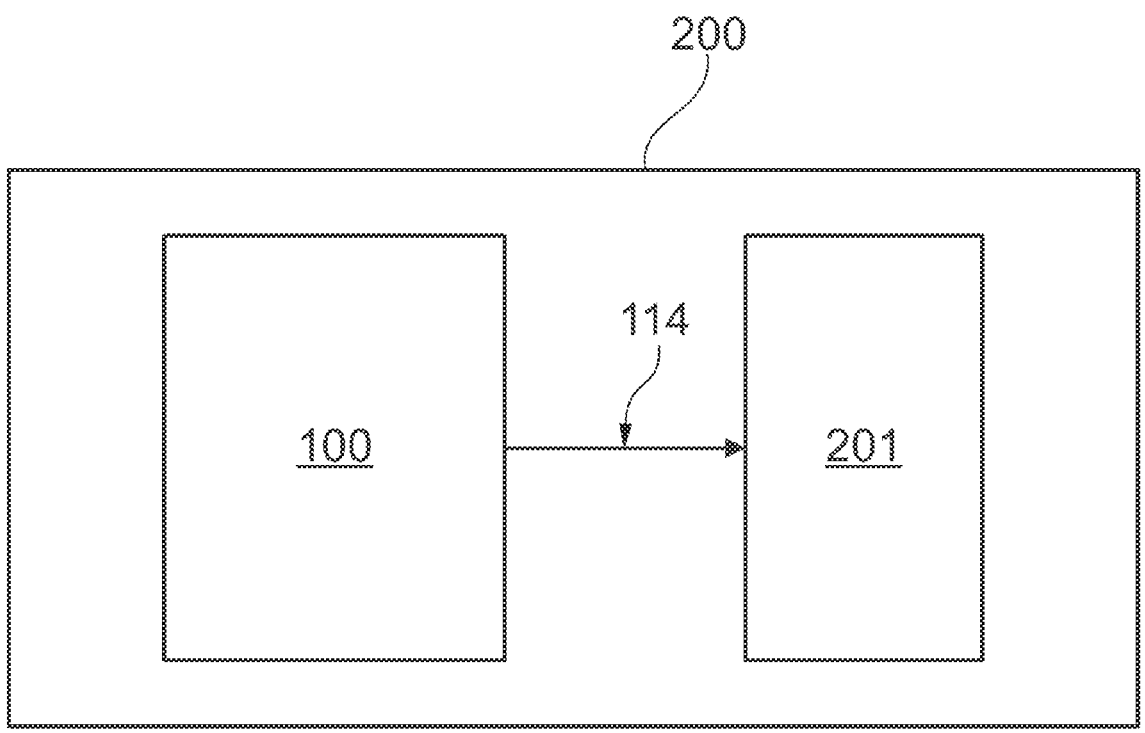
Figure 3:
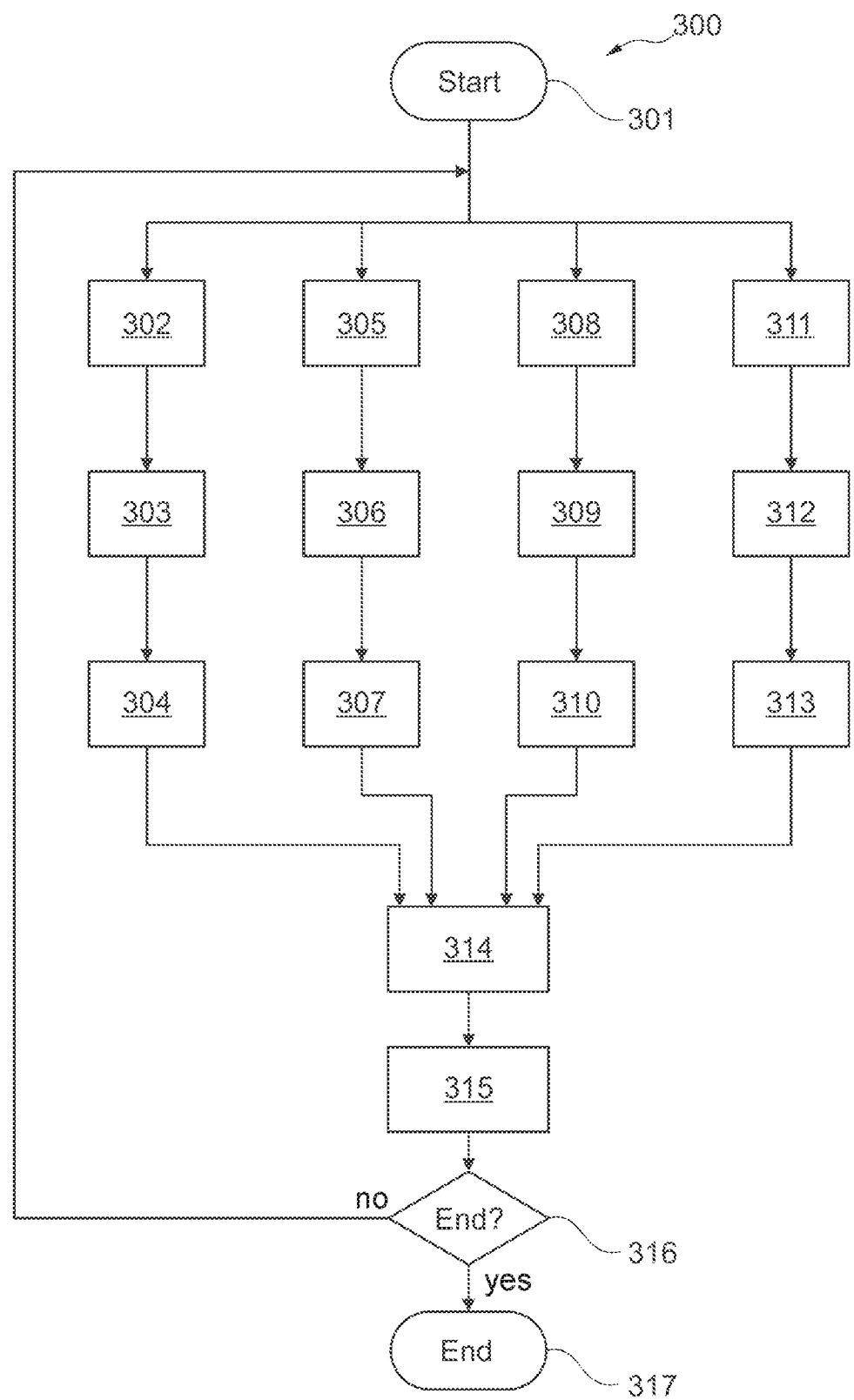

Further advantages of the present invention are apparent from the detailed description and the figures. The invention is explained in more detail hereafter with the following description of exemplary embodiments and with reference to the enclosed illustrations. Shown are:

FIG. 1 a schematic representation of an apparatus according to the invention for determining an attention requirement level of a driver of a vehicle in an exemplary design;

FIG. 2 a schematic representation of a vehicle according to the invention in an exemplary design; and FIG. 3 a schematic representation of a method according to the invention for determining an attention requirement level of a driver of a vehicle in an exemplary design.

In the figures, identical or similar elements are labeled with identical reference numerals, where this is appropriate.

It is understood that other embodiments can be used and structural or logical changes can be made without departing from the scope of protection of the present invention. It goes without saying that the features of the various exemplary embodiments described above and hereafter can be combined with one another, unless specifically stated otherwise. The description is therefore not to be understood in a restrictive sense, and the scope of protection of the present invention is defined by the attached claims.

FIG. 1 shows a schematic representation of an apparatus 100 according to the invention for determining a required level of attention, i.e. an attention requirement level, of a driver of a vehicle in an exemplary design. The apparatus 100 shown has a first signal processing unit 101, configured to receive and process traffic situation-related first input signals 102 and to provide a traffic situation-related first attention requirement parameter 103. In addition, the apparatus 100 has a second signal processing unit 104, which is configured to receive and process environmental condition-related second input signals 105 and to provide an environmental condition-related second attention requirement parameter 106, in addition to a third signal processing unit 107, which is configured to receive and process vehicle status-related third input signals 108 and to provide a vehicle status-related third attention requirement parameter 109, and a fourth signal processing unit 110, which is configured to receive and process travel route-related fourth input signals 111 and to provide a travel route-related fourth attention requirement parameter 112. An attention requirement determination unit 113 is connected to the first, second, third and fourth signal processing unit 101, 104, 107, 110 and configured to determine an attention requirement level 114 as a function of current values of the first, second, third and fourth attention requirement parameters 103, 106, 109, 112.

In the exemplary embodiment shown each of the signal processing units comprises a sensor unit for receiving the corresponding input signals, a processing unit for providing corresponding evaluation signals, and a metric transformation unit.

The first signal processing unit 101 comprises a first sensor unit 115 for receiving the corresponding traffic situation-related first input signals 102, which is connected to a first evaluation unit 119 which evaluates the first input signals and provides a first evaluation signal 123. Depending on whether the first sensor unit provides analog or digitally processable signals, an analog/digital conversion is first provided if necessary. Depending on the input signal, the evaluation comprises, for example, a digital signal filtering or even complex analysis algorithms, in the case of camera sequences, for example, an object detection, classification, etc. The first evaluation signal 123 is then subjected to a metric transformation by a first metric transformation unit 127. The first metric transformation unit 127 then outputs the traffic situation-related first attention requirement parameter 103 to the attention requirement determination unit 113.

Correspondingly, the second signal processing unit 104 comprises a second sensor unit 116 for receiving the corresponding environmental condition-related second input signals 105, which is connected to a second evaluation unit 120 which evaluates the second input signals and provides a second evaluation signal 124. The second evaluation signal 124 is then subjected to a metric transformation by a second metric transformation unit 128. The second metric transformation unit 128 then outputs the environmental condition-related second attention requirement parameter 106 to the attention requirement determination unit 113.

The third signal processing unit 107 comprises a third sensor unit 117 for receiving the corresponding vehicle status-related third input signals 108, which is connected to a third evaluation unit 121 which evaluates the third input signals and provides a third evaluation signal 125. The third evaluation signal 125 is then subjected to a metric transformation by a third metric transformation unit 129. The third metric transformation unit 129 then outputs the vehicle status-related third attention requirement parameter 109 to the attention requirement determination unit 113.

And the fourth signal processing unit 110 comprises a fourth sensor unit 118 for receiving the corresponding travel route-related fourth input signals 111, which is connected to a fourth evaluation unit 122 which evaluates the fourth input signals and provides a fourth evaluation signal 126. The fourth evaluation signal 126 is then subjected to a metric transformation by a fourth metric transformation unit 130. The fourth metric transformation unit 130 then outputs the vehicle status-related fourth attention requirement parameter 112 to the attention requirement determination unit 113.

In the exemplary embodiment shown, the attention requirement level 114 is determined by the attention requirement determination unit 113 by averaging the current values of the first, second, third and fourth attention requirement parameters 103, 106, 109, 112.

In one example the first sensor unit 115 comprises a camera, which provides digital image sequences from the environment around the vehicle, e.g. up to a distance of 500 m, as traffic situation-related first input signals 102. The first evaluation unit 119 applies image analysis algorithms to the image sequences and identifies the number of vehicles in the image area. The first metric transformation unit 127 applies a classification algorithm, which determines the number of vehicles and, for example, their distance to the first sensor unit 115 and determines a traffic density, the value of which is mapped to a range between 0 and 1. In the example, the second sensor unit 116 comprises a light intensity sensor, which measures the variation of the light intensity over time as environmental condition-related second input signals 105. At a measurement of, for example, 50000 lux, which corresponds e.g. approximately to a daylight illumination in sunny conditions, after analog-to-digital conversion in the second evaluation unit 120 the second metric transformation unit 128 will determine a current value of the second attention requirement parameter 106 in the region of 0. Similarly, the third sensor unit 117 determines, for example, the speed of the vehicle as vehicle status-related input signals 108. This is then classified or evaluated, e.g. as a deviation from the maximum permissible speed value. As travel route-related fourth input signals 111, for example, the fourth sensor unit 118 records the distance travelled, measured for example since the engine was last started, and the variance of the speed over this distance. This is then evaluated or classified on the basis of stored empirical values. Once all four attention requirement parameters have been mapped to a value range from 0 to 1, the attention requirement level 114 is then calculated as an average value. In a preferred embodiment the apparatus is operated during the entire journey and the attention requirement level 114 is updated continuously or at specific time intervals.

The interaction of the different units is controlled by a control device (not shown). Depending on the particular embodiment, the different units and the control device are implemented either entirely or partially as electronic circuits, or individually or jointly using one or more programmable devices with a processor and a memory.

FIG. 2 shows a schematic representation of a vehicle 200 according to the invention in an exemplary design. The vehicle 200 comprises an apparatus 100 for determining a required level of attention, i.e. an attention requirement level 114, of a driver (not shown) of the vehicle 200. The apparatus 100 can correspond, for example, to the apparatus 100 shown in FIG. 1. In the exemplary embodiment shown, the vehicle 200 also has an attention increasing device 201, which is connected to the apparatus 100 for determining an attention requirement level 114. The attention increasing device 201 is configured to stimulate the attention of the driver of the vehicle 200 as a function of the determined attention requirement level 114, and to direct it towards controlling the vehicle 200.

FIG. 3 shows a schematic representation of a method 300 according to the invention for determining an attention requirement level of a driver of a vehicle, in an exemplary design.

The method 300 for determining an attention requirement level of a driver of a vehicle with an apparatus according to one of the above-described embodiments starts in an initial state 301.

The following steps are carried out simultaneously or consecutively: firstly, receiving 302 and processing 303 of traffic situation-related first input signals and providing 304 a traffic situation-related first attention requirement parameter; secondly, receiving 305 and processing 306 of environmental condition-related second input signals and providing 307 an environmental condition-related second attention requirement parameter; additionally receiving 308 and processing 309 of vehicle status-related third input signals and providing 310 a vehicle status-related third attention requirement parameter, and finally also receiving 311 and processing 312 of travel route-related fourth input signals and providing 313 a travel route-related fourth attention requirement parameter.

In a following step an attention requirement level is determined 314 as a function of current values of the first, second, third and fourth attention requirement parameters.

The exemplary embodiment shown in FIG. 3 additionally comprises a stimulation 315, using an attention raising device, of the attention of the driver of the vehicle as a function of the determined attention requirement level.

The method provides a test 316 of whether the method should be terminated or continued. If the result is positive, for example because the apparatus was deactivated or the vehicle was switched off, the method is terminated 317. If the result is negative, for example because the apparatus will continue to be operated continuously, the method is continued with the reception 302, 305, 308, 311 of the first, second, third and fourth input signals.

It is self-evident that method steps, although described according to a certain ordered sequence, could be carried out in part in a sequence other than that described here. It is also self-evident that certain steps can be carried out at the same time, that other steps could be added, or that certain steps described here could be omitted. In other words: these descriptions are provided for the purpose of illustrating specific embodiments and should not be construed as a limitation of the subject matter disclosed.

Unless otherwise specified, terms such as "first", "second", "third" and "fourth", etc. (for example, first, second, third and fourth input signals, first, second, third and fourth signal processing units, first, second, third and fourth attention requirement parameters) have only been used in order to distinguish between the respective elements or parameters.

The use of the terms therefore implies no qualitative or other prioritization of one or the other element or parameter.

The figures are not necessarily accurate in every detail or true to scale and can be shown enlarged or reduced in order to provide a better overview. Therefore, functional details disclosed here are not to be understood in a restrictive sense, but merely as a descriptive basis which offers guidance to the person skilled in the art in this field of technology for applying the present invention in a variety of ways.

Although the invention has been illustrated and described in greater detail by means of the preferred exemplary embodiments, the invention is not restricted by the examples disclosed and other variations can be derived therefrom by the person skilled in the art without departing from the scope of protection of the invention. The invention should therefore not be limited to individual embodiments but only by the appended claims.

LIST OF REFERENCE NUMERALS 100 apparatus for determining an attention requirement level of a driver of a vehicle
101 first signal processing unit
102 first input signals
103 first attention requirement parameter
104 second signal processing unit
105 second input signals
106 second attention requirement parameter
107 third signal processing unit
108 third input signals
109 third attention requirement parameter
110 fourth signal processing unit
111 fourth input signals
112 fourth attention requirement parameter
113 attention requirement determination unit
114 attention requirement level
115 sensor unit for receiving the first input signals
116 sensor unit for receiving the second input signals
117 sensor unit for receiving the third input signals
118 sensor unit for receiving the fourth input signals
119 first evaluation unit
120 second evaluation unit
121 third evaluation unit
122 fourth evaluation unit
123 first evaluation signal
124 second evaluation signal
125 third evaluation signal
126 fourth evaluation signal
127 first metric transformation unit
128 second metric transformation unit
129 third metric transformation unit
130 fourth metric transformation unit
200 vehicle
201 attention increasing device
300 method for determining an attention requirement level
301 initial state
302 reception of first input signals
303 processing of first input signals
304 providing a first attention requirement parameter
305 reception of second input signals
306 processing of second input signals
307 providing a second attention requirement parameter
308 reception of third input signals
309 processing of third input signals
310 providing a third attention requirement parameter
311 reception of fourth input signals
312 processing of fourth input signals
313 providing a fourth attention requirement parameter
314 determining an attention requirement level
315 stimulating the attention of the driver of the vehicle
316 testing whether the method should be terminated
317 final state

The invention claimed is:

1. An apparatus (100) for determining an attention requirement level of a driver of a vehicle, the apparatus comprising:
a first signal processing unit (101) configured to receive and process traffic situation-related first input signals (102) and to provide a traffic situation-related first attention requirement parameter (103);
a second signal processing unit (104) configured to receive and process environmental condition-related second input signals (105) and to provide an environmental condition-related second attention requirement parameter (106);
a third signal processing unit (107) configured to receive and process vehicle status-related third input signals (108) and to provide a vehicle status-related third attention requirement parameter (109);
a fourth signal processing unit (110) configured to receive and process travel route-related fourth input signals (111) and to provide a travel route-related fourth attention requirement parameter (112), wherein the travel route-related fourth input signals (111) comprise at least information about a travel history; and
an attention requirement determination unit (113) connected to the first, second, third, and fourth signal processing units (101, 104, 107, 110) and configured to determine the attention requirement level (114) as a function of current values of the first, second, third, and fourth attention requirement parameters (103, 106, 109, 112).

2. The apparatus according to claim 1, wherein the first, second, third, and fourth signal processing units (101, 104, 107, 110) each comprise at least one sensor unit (115, 116, 117, 118) configured to receive the corresponding first, second, third, or fourth input signals (102, 105, 108, 111) and which is connected in each case to an associated first, second, third, and fourth evaluation unit (119, 120, 121, 122) to provide respectively associated first, second, third, or fourth evaluation signals (123, 124, 125, 126).

3. The apparatus according to claim 2, wherein the first, second, third, and fourth signal processing units (101, 104, 107, 110) each respectively have a first, a second, a third, and a fourth metric transformation unit (127, 128, 129, 130) configured to provide the associated first, second, third, or fourth attention requirement parameters (103, 106, 109, 112).

4. The apparatus according to claim 3, wherein the first, second, third, and fourth metric transformation units (127, 128, 129, 130) are each configured to perform transformations of the first, second, third, or fourth evaluation signals (123, 124, 125, 126) into a common value range.

5. The apparatus according to claim 4, wherein the first, second, third, and fourth metric transformation units (**127, 128, 129, 130) are each configured to apply a sigmoid transfer function to the transformation of the first, second, third, or fourth evaluation signals (123, 124, 125, 126) into the value range.

6. The apparatus according to claim 2, wherein the at least one sensor unit (115) for receiving the associated first input signals (102) is designed to collect traffic situation-related information in an environment around the vehicle.

7. The apparatus according to claim 6, wherein the at least one sensor unit (115) for receiving the associated first input signals (102) comprises at least one of the following: a camera sensor, a laser sensor, a lidar sensor, a radar sensor, an ultrasonic sensor, and/or a wireless interface for receiving information about other road users via V2X communication link.

8. The apparatus according to claim 2, wherein the at least one sensor unit (116) for receiving the associated second input signals (105) is designed to collect environmental conditions in an environment around the vehicle.

9. The apparatus according to claim 8, wherein the environmental conditions comprise at least one of the following: visibility conditions, brightness, time of day, weather conditions, and/or geographical conditions.

10. The apparatus according to claim 2, wherein the at least one sensor unit (117) for receiving the associated third input signals (108) is designed to collect vehicle status information of the vehicle.

11. The apparatus according to claim 10, wherein the vehicle status information comprise at least one of the following; vehicle speed, vehicle acceleration, steering angle, and/or activation states of driver assistance systems.

12. The apparatus according to claim 2, wherein the at least one sensor unit (118) for receiving the associated fourth input signals (111) is designed to collect travel route-related information of the vehicle.

13. The apparatus according to claim 12, wherein the travel route-related fourth input signals (111) further comprises at least one of the following: distance traveled, travel time to date, and/or speed profile.

14. The apparatus according to claim 1, wherein the attention requirement determination unit (113) is configured to determine the attention requirement level (114) by averaging current values of the first, second, third, and fourth attention requirement parameters (103, 106, 109, 112).

15. A vehicle (200), comprising the apparatus of claim 1.

16. The vehicle according to claim 15, further comprising an attention increasing device (201) connected to the apparatus (100) for determining the attention requirement level (114) and configured to:
  stimulate an attention of the driver of the vehicle (200) as a function of the determined attention requirement level (114), wherein an amount of stimulation is determined based on the determined attention requirement level (114), and
  direct the attention of the driver towards controlling the vehicle (200).

17. A method (300) for determining an attention requirement level of a driver of a vehicle, the method comprising:
  receiving (302) and processing (303) traffic situation-related first input signals and providing (304) a traffic situation-related first attention requirement parameter;
  receiving (305) and processing (306) environmental condition-related second input signals and providing (307) an environmental condition-related second attention requirement parameter;
  receiving (308) and processing (309) vehicle status-related third input signals and providing (310) a vehicle status-related third attention requirement parameter;
  receiving (311) and processing (312) travel route-related fourth input signals and providing (313) a travel route-related fourth attention requirement parameter, wherein the travel route-related fourth input signals comprise at least information about a travel history; and
  determining (314) an attention requirement level as a function of current values of the first, second, third, and fourth attention requirement parameters.

18. The method according to claim 17, further comprising stimulating (315), with an attention raising device, an attention of the driver of the vehicle as a function of the determined attention requirement level, wherein an amount of stimulation is determined based on the determined attention requirement level.

* * * * *